UNITED STATES PATENT OFFICE.

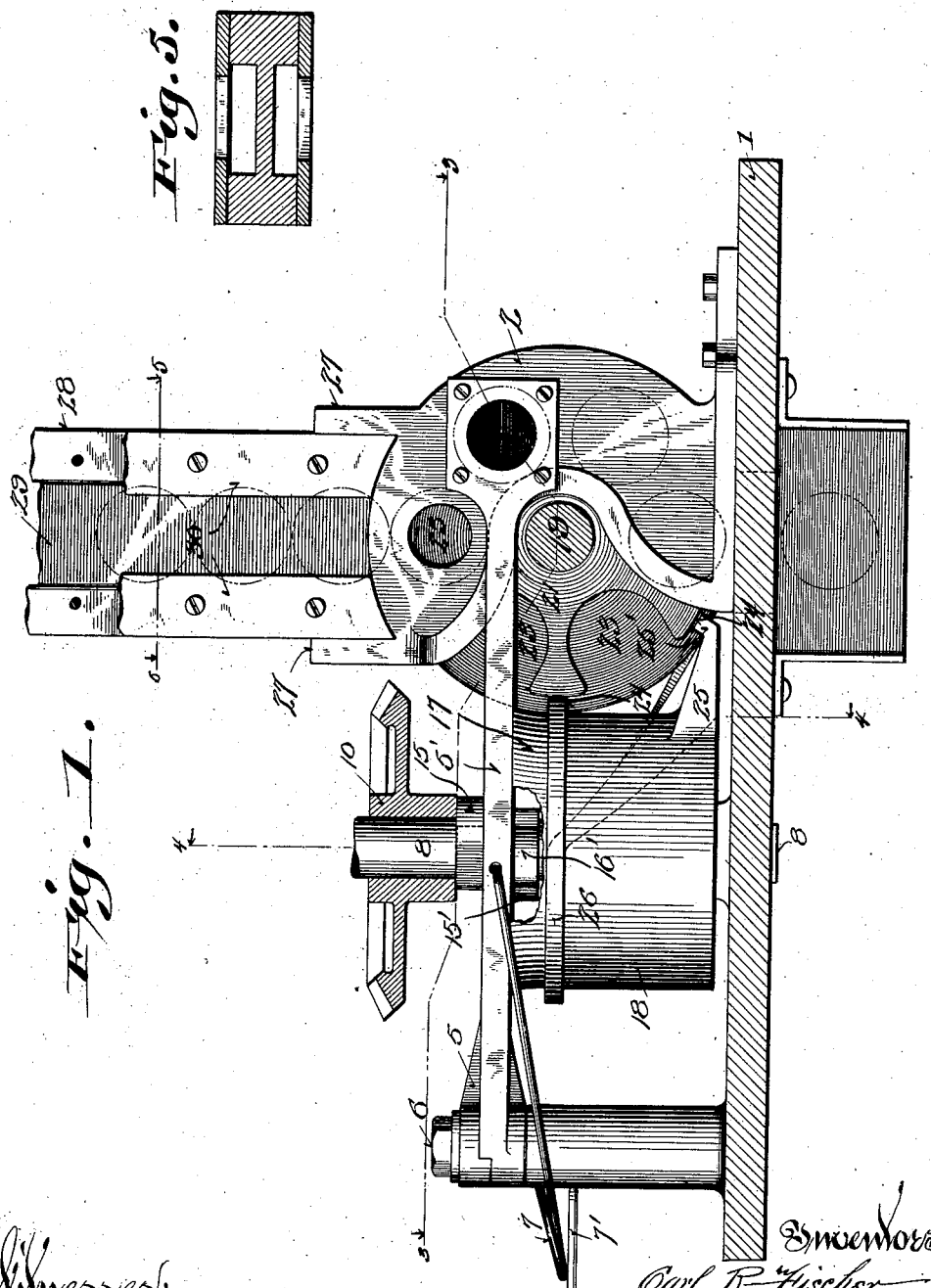

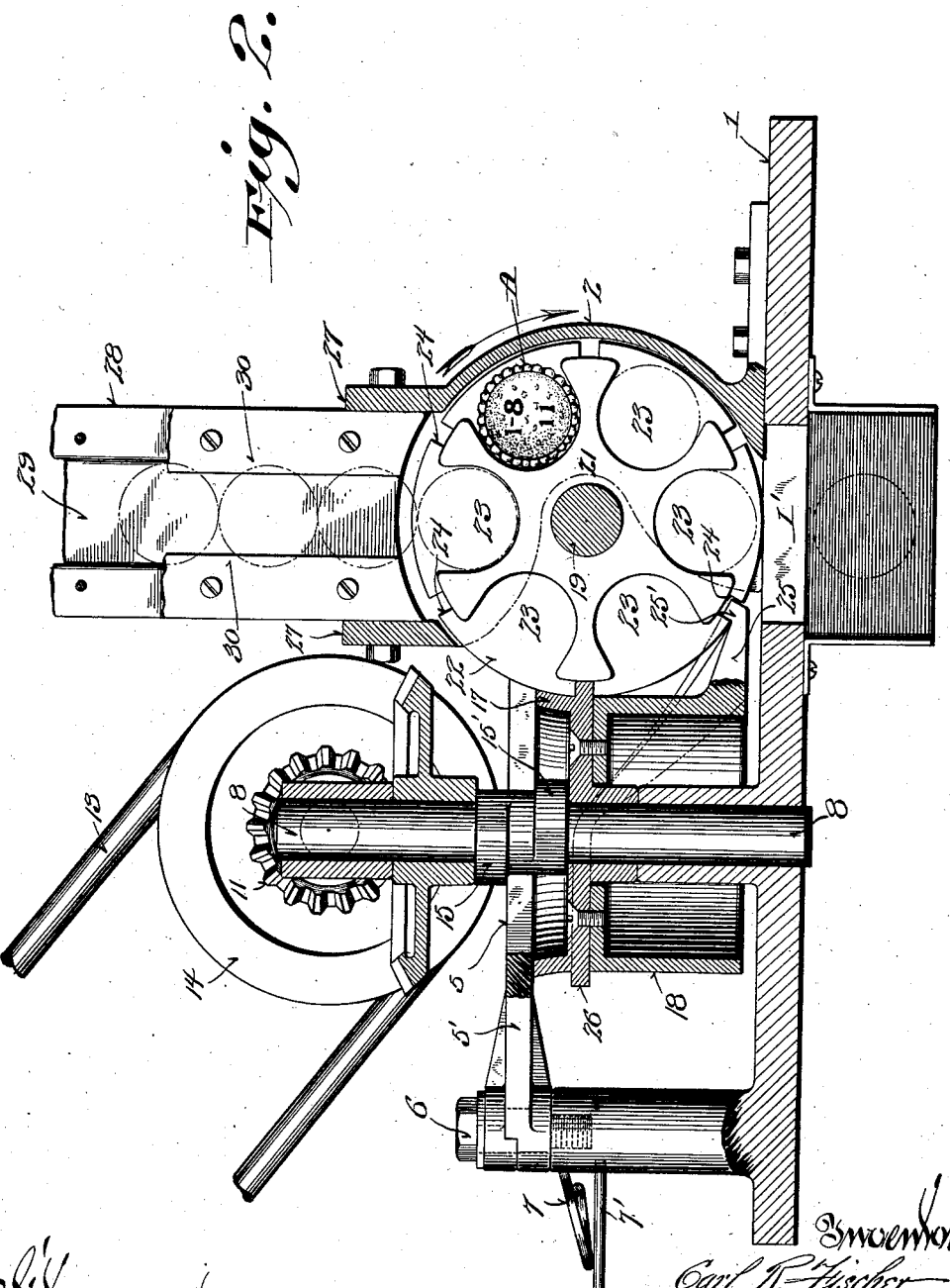

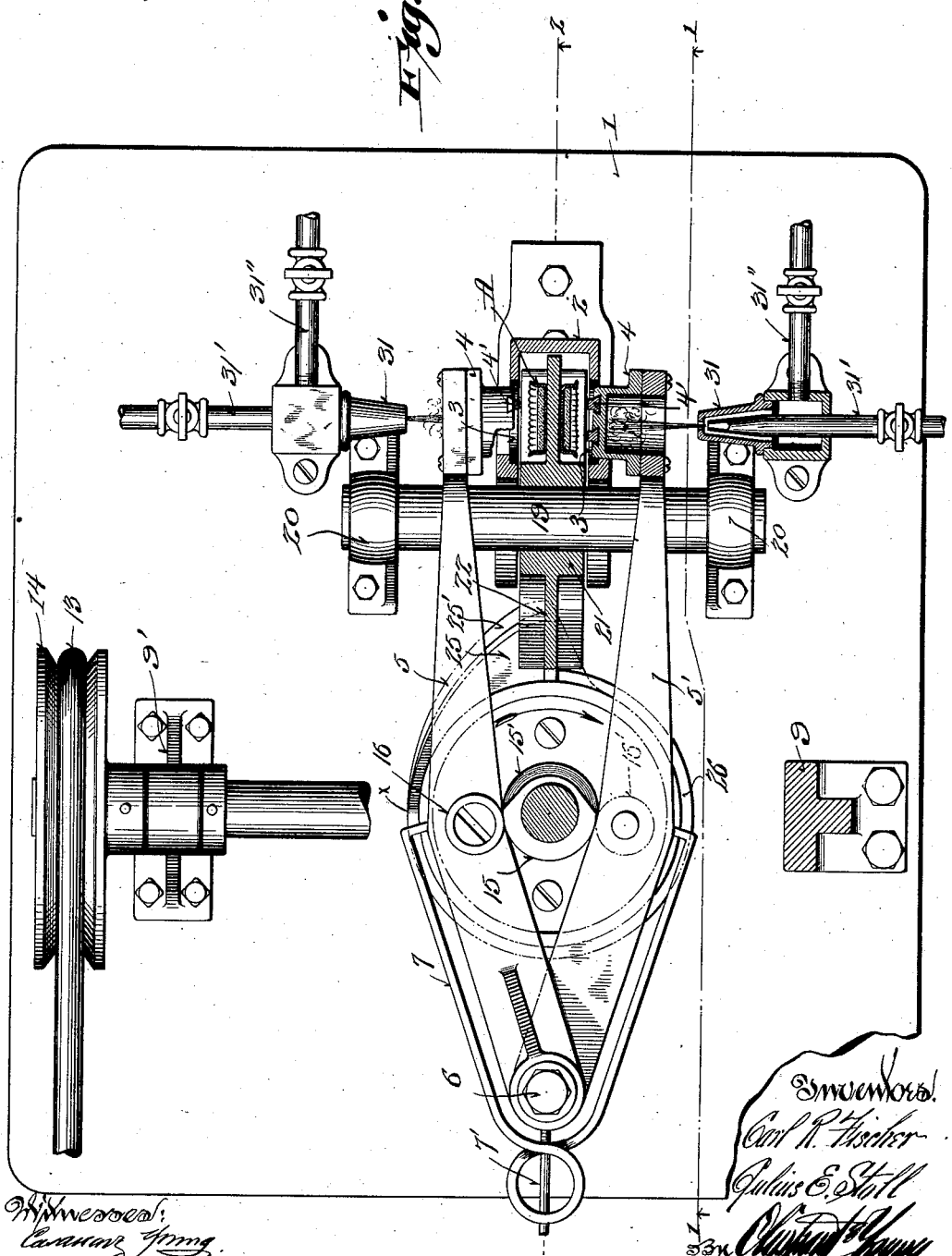

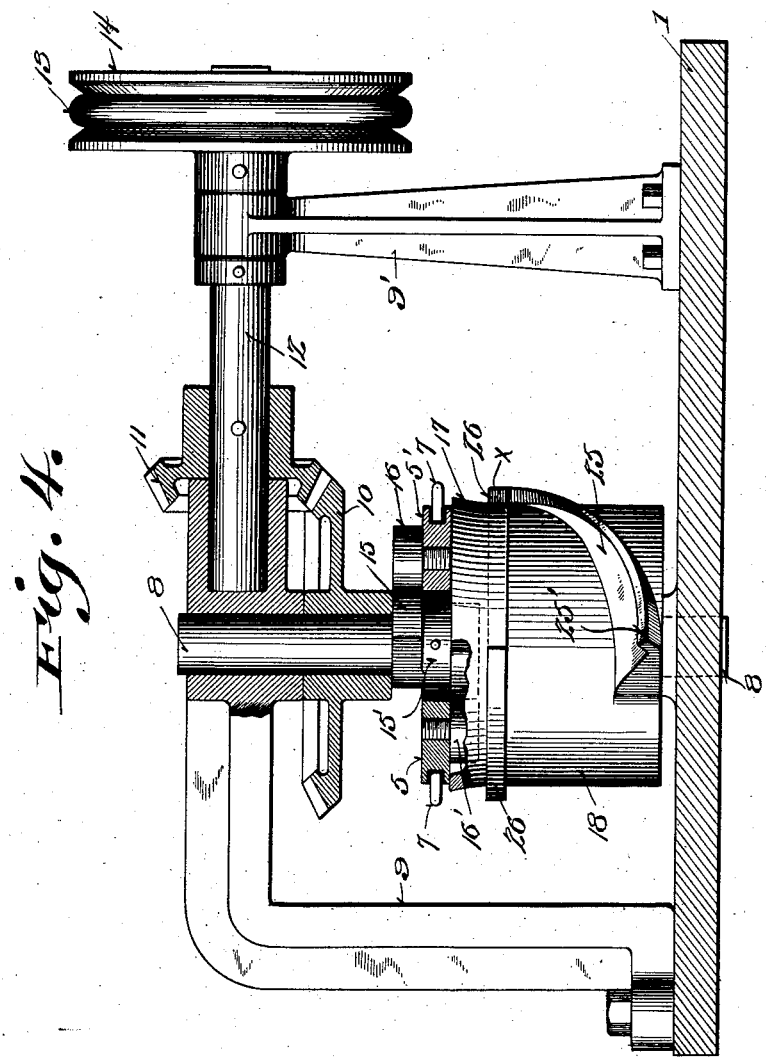

CARL R. FISCHER AND JULIUS E. STOLL, OF MILWAUKEE, WISCONSIN.

BRANDING-MACHINE.

1,021,767. Specification of Letters Patent. Patented Apr. 2, 1912.

Application filed June 26, 1911. Serial No. 635,423.

*To all whom it may concern:*

Be it known that we, CARL R. FISCHER and JULIUS E. STOLL, both citizens of the United States, and residents of Milwaukee, in the county of Milwaukee and State of Wisconsin, have invented certain new and useful Improvements in Branding-Machines; and we do hereby declare that the following is a full, clear, and exact description thereof.

Our invention refers to branding machines, its primary object being to provide a simple, economical and efficient machine for branding sealing caps or the like.

Specific objects of our invention are to provide means whereby the capacity of a single machine is materially increased without increasing the speed of the various mechanical movements; to provide a movable carrier for delivering the articles to be branded to the branding dies and thereafter discharging the same by gravity; to provide an arbor having cams for actuating the conveyer and branding dies; to provide a delay-shoe in connection with the conveyer driving cam, whereby said conveyer is positively locked against movement for a predetermined time during which time the branding dies are brought into operation, and to provide the conveyer with two or more sets of pockets, each set being in register with a chute whereby the articles to be branded are delivered to the conveyer and branded in multiple.

The construction and arrangement of our machine as illustrated, in brief, are such that a vertically disposed arbor carrying cam-members imparts movement to a pair of branding dies whereby two sealing caps are simultaneously operated upon, the same being delivered to the branding dies by a rotary disk, constituting a conveyer having two sets of oppositely disposed peripheral cork-receiving pockets therein, which conveyer is intermittently driven in timed relation to the movement of said branding dies whereby a pair of corks are by gravity successively delivered to the conveyer from the mouths of oppositely disposed chutes, brought to the branding point, held during a branding operation and thereafter discharged by gravity from said conveyer.

With the above objects in view the invention consists in what is herein illustrated, described and subsequently claimed.

In the drawings Figure 1 represents a sectional side elevation of a branding machine embodying the features of our invention with parts broken away, the section being indicated by line 1—1 of Fig. 3; Fig. 2, a similar view, the section being taken upon a plane indicated by line 2—2 of Fig. 3; Fig. 3, a plan view of the machine with parts broken away and parts in section as indicated by line 3—3 of Fig. 1; Fig. 4, a detail cross-section illustrating the driving gear, the section being indicated by line 4—4 of Fig. 1, and Fig. 5, a detail cross-section of the cork-delivery chutes.

Referring by characters to the drawings, 1 represents a bed-plate to which is secured a circular housing 2, the side walls of the same being provided with oppositely alined openings 3 for the admission of die thimbles 4, which dies are secured to the end of horizontally disposed arms 5, 5′, the opposite ends of the arms being fulcrumed upon a common stud 6 which is supported by a post that projects from the bed-plate. The arms operate similar to jaw-members and are held in their contracted position by a looped spring 7, the ends of which are secured in recesses of the arms, while the rear throat coil is supported upon a pin 7′ that extends from the post which carries the stud 6. Extending upwardly between the arms 5 and 5′ is an arbor 8, the lower end of which is journaled in the bed-plate, while its upper end is journaled in a bracket 9 that is carried by said plate. Motion is imparted to the arbor through a beveled gear-wheel 10 that is fast thereon, the latter being meshed with a beveled pinion 11, which beveled pinion is secured to a counter-shaft 12, the ends of the latter being respectively journaled in the bracket 9 and a standard 9′ which projects upwardly from and is secured to said bed-plate. The counter-shaft receives its drive from an endless belt 13 which passes over a pulley 14 that is secured to said counter-shaft and a similar pulley, not shown, that receives its power from any suitable source.

Secured to the arbor 8 below the beveled gear-wheel is a cam having working faces 15, 15′, the same being upon different planes with their high points upon diametrically opposite sides of the arbor. The upper working face 15 is arranged to engage an anti-friction roller 16 that is carried by the die-arm 5 and the lower working face 15′ is adapted to engage a similar roller 16′ that is carried by the arm 5′. Sagging strain upon the die-arms is relieved by a flange 17 of a cam-barrel 18, which cam-barrel is secured to the arbor, its flange 17 being arranged to have sliding engagement with the lower faces of said arms.

The side walls of the circular housing 2 are cut away from a point about its axis and fitted through the cut away portion of said housing is a trunnion 19, the ends of the same being mounted in bearing-brackets 20 that are secured to the bed-plate. The trunnion carries a vertically disposed disk 21 which is rotatably mounted within the housing, being provided with a central web 22 and sets of peripheral pockets 23 which sets of pockets are diametrically opposite each other. The web portion of the disk is provided with a series of peripheral notches 24 which correspond in number to the sets of pockets and constitute teeth. These notches are arranged to be successively engaged by a spiral cam-section 25 which is carried by the cam-barrel 18, the latter being horizontally rotatable with the arbor. As best shown in Fig. 2, the cam-section 25 has a lip 25' which is at such an angle that it will engage a registered notch of the cam-section and owing to the fact that the cam-section is spirally and upwardly inclined said conveyer disk will be rotated in the direction of the arrow incidental to rotation of the cam-barrel in the direction of the arrow indicated thereon, the rotation of the disk being equal to the distance between centers of a pair of the pockets. When this partial rotation is completed by the cam-section, the notch in which the lip of said cam-section is engaged will be brought into alinement with a delay-shoe 26 into which the cam-section merges. This delay-shoe is in the form of a horizontally disposed straight flange which terminates abruptly at a point in alinement with the end of the cam-section lip upon its highest plane and hence it will be seen that just as the delay-shoe is disengaged from one of the disk notches the following notch of said disk is engaged by the lip whereby the disk, which constitutes a conveyer, and is controlled by the cam mechanism is positively locked when not in motion.

The housing terminates with an upwardly extending throat 27 into which is fitted and secured the lower end of a chute 28, the same being, as shown, vertically disposed and is arranged with a central partition 29 whereby a pair of oppositely disposed chute-compartments are formed, there being parallel plates 30, secured to the opposite outer faces of the chute to form retaining walls or runways for two series of sealing caps A which are fed therethrough from any suitable source, it being understood that said sealing caps in each chute are arranged so as to present their cork-disk faces outwardly whereby access thereto may be had for branding. The bed-plate is provided with a discharge aperture 1' directly alined with the pair of chutes and under the conveyer as best shown in Fig. 2, whereby the sealing caps after being branded are discharged by gravity from the conveyer pockets.

As shown in Fig. 3, each of the die-thimbles is alined with suitable valve-controlled burners 31 whereby the latter are properly heated, the fuel pipe 31' of each burner being supplied with oxygen from a pipe 31", it being understood, however, that the form of burner shown forms no part of our invention.

In the operation it is apparent that when the conveyer disk is in the position shown in Fig. 1 that there will be a sealing cap delivered to the pair of pockets alined with the chutes. A pair of these sealing caps, as shown, are within the pockets alined with the housing openings 3 and have just been operated upon or branded. The lip 25' of the cam-section will now engage that disk notch 24 which is alined therewith and cause rotation of said disk through a distance equal to the distance between centers of the pockets. This movement of the disk will deliver a fresh set of sealing caps A to a position for branding and when they are so positioned the engaged notch of the cam-section will have reached the point indicated at x of the delay-shoe 26. No further movement of the disk will therefore take place during approximately three quarters of a revolution of the cam-drum. In the meantime the high working faces 15 and 15' of the die-arm cam will have simultaneously passed their respective engaged rollers 16 and 16' and thus permit the arms to move toward each other under their spring pressure. The vibrating die-thimbles will travel in and impress the cork-disks which are presented opposite the housing openings. This impression will be the full strength of the spring 7 owing to the fact that sufficient clearance between the anti-friction rollers 16, 16' and low faces of their respective cams will permit full pressure of the spring to be exerted. The high faces 15 and 15' of the cams will then work in opposition to the spring 7 and expand the dies whereby a clearance for travel of the disk or conveyer is permitted and said conveyer will then describe another one-sixth of a revolution, causing a pair of crown-corks which have previously been branded to be discharged and thus it will be seen that with each movement of the mechanism a pair of crown-disks are branded.

As shown in Fig. 3, the die thimbles 4 are provided with steel type 4' which are dovetailed into grooves in the heads of the thimbles thus making it convenient for replacing said type from time to time.

We claim:

1. A branding machine comprising a pair of vertically disposed delivery chutes having open discharge mouths, a vertically arranged disk conveyer located under the chutes having a set of pockets for registration with the mouths of the chutes, actuating gear for the disk, a pair of vibratory branding dies, each being arranged to aline with a set of the disk pockets, and actuating means for the dies.

2. A branding machine comprising a pair of vertically disposed delivery chutes having open discharge mouths, a vertically arranged toothed disk conveyer located under the chutes having a set of pockets for registration with the mouth of each chute, a horizontally disposed cam-section for engagement with the conveyer disk-teeth, the cam-section being provided with a delay-shoe terminal whereby the disk is intermittently held, oppositely disposed branding dies each being arranged to register successively with the sets of disk conveyer pockets, fulcrumed spring-controlled supporting arms for the branding dies, and actuating cams for said arms.

3. A branding machine comprising an apertured bed-plate, a circular housing supported upon the bed-plate over its aperture, a pocketed disk revolubly mounted within the housing, the housing being provided with openings arranged to register successively with the disk pockets, vibratory branding dies alined with the housing openings, a pair of oppositely disposed vertical chutes in communication with the housing, means for imparting positive intermittent rotation to the disk whereby its pockets are successively alined with the chutes and housing openings, and means for imparting intermittent movement to the branding dies in timed relation to movement of the disk.

4. A branding machine comprising an apertured bed-plate, a vertical housing located over the bed-plate, the housing side walls being provided with registered openings, a pair of vertically disposed delivery chutes having open mouths in communication with the housing, a vertically arranged toothed disk-conveyer revolubly mounted in the housing, the disk conveyer being provided with sets of pockets for successive registration with the chute mouths, housing openings and bed-plate aperture, a horizontally disposed cam-section for engagement with the disk teeth, the cam-section being provided with a delay-shoe terminal whereby the disk is intermittently locked against rotation, a vertically disposed supporting arbor for the cam-section, a pair of branding dies alined with the housing openings, burners in juxtaposition to the dies, spring-controlled fulcrumed supporting arms for said dies, actuating cams for the arms carried by the arbor, and driving means for said arbor.

In testimony that we claim the foregoing we have hereunto set our hands at Milwaukee in the county of Milwaukee and State of Wisconsin in the presence of two witnesses.

CARL R. FISCHER.
JULIUS E. STOLL.

Witnesses:
F. A. BOETTCHER,
HERBERT C. STARK.

---

Copies of this patent may be obtained for five cents each, by addressing the "Commissioner of Patents, Washington, D. C."